(12) United States Patent
Chen et al.

(10) Patent No.: US 8,703,365 B2
(45) Date of Patent: Apr. 22, 2014

(54) UV MASK WITH ANTI-REFLECTION COATING AND UV ABSORPTION MATERIAL

(71) Applicant: Apple Inc., Cupertino, CA (US)

(72) Inventors: Cheng Chen, San Jose, CA (US); Kyung-Wook Kim, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/633,812

(22) Filed: Oct. 2, 2012

(65) Prior Publication Data

US 2013/0233482 A1    Sep. 12, 2013

Related U.S. Application Data

(60) Provisional application No. 61/607,458, filed on Mar. 6, 2012.

(51) Int. Cl.
*G02B 5/20* (2006.01)
*G03F 1/22* (2012.01)

(52) U.S. Cl.
USPC ............................................................ 430/5

(58) Field of Classification Search
USPC .................... 430/5, 321; 378/35; 349/113
See application file for complete search history.

(56) References Cited

U.S. PATENT DOCUMENTS

| | | |
|---|---|---|
| 4,958,205 A | 9/1990 | Takeda et al. |
| 5,075,237 A | 12/1991 | Wu |
| 5,990,492 A | 11/1999 | Kim et al. |
| 6,037,017 A | 3/2000 | Kashiro |
| 6,372,636 B1 | 4/2002 | Chooi et al. |
| 6,500,701 B2 | 12/2002 | Higashi et al. |
| 6,882,398 B2 | 4/2005 | Watanabe et al. |
| 6,970,219 B1 | 11/2005 | Hermann |
| 7,476,896 B2 | 1/2009 | Choi et al. |
| 7,767,502 B2 | 8/2010 | Kim et al. |
| 8,003,986 B2 | 8/2011 | Teng et al. |
| 8,113,902 B2 | 2/2012 | Kang et al. |
| 8,373,181 B2 | 2/2013 | Aurongzeb et al. |
| 2004/0063001 A1 | 4/2004 | Wu et al. |
| 2006/0043318 A1 | 3/2006 | Kodera |
| 2011/0006301 A1 | 1/2011 | Yamazaki et al. |
| 2011/0227064 A1 | 9/2011 | Park et al. |
| 2011/0250435 A1* | 10/2011 | Ge et al. .................. 428/323 |

(Continued)

FOREIGN PATENT DOCUMENTS

| | | |
|---|---|---|
| EP | 1801647 | 6/2007 |
| JP | 2003-057661 | 2/2003 |
| WO | WO 2011/151970 | 12/2011 |

OTHER PUBLICATIONS

International Search Report and Written Opinion dated May 27, 2013, PCT/US2013/028925, 9 pages.

*Primary Examiner* — Stephen Rosasco
(74) *Attorney, Agent, or Firm* — Brownstein Hyatt Farber Schreck, LLP

(57) ABSTRACT

One embodiment may take the form of a UV mask for use while curing sealant on LCD displays. The UV mask includes a mother glass and a UV mask layer on the mother glass. A UV absorption film is located adjacent the UV mask layer and an anti-reflection (AR) film is located adjacent the UV absorption film.

19 Claims, 9 Drawing Sheets

(56) References Cited

U.S. PATENT DOCUMENTS

2012/0248451 A1 10/2012 Sone et al.
2013/0020731 A1 1/2013 Kim et al.
2013/0069061 A1 3/2013 Nakazawa
2013/0161622 A1 6/2013 Lee

* cited by examiner

UV MASK WITH ANTI-REFLECTION COATING AND UV ABSORPTION MATERIAL

CROSS-REFERENCE TO RELATED APPLICATIONS

The present application claims priority to U.S. Provisional Patent Application No. 61/607,458, filed Mar. 6, 2012, and titled "UV Mask With Anti-reflection Coating and UV Absorption Material," which is incorporated herein by reference in its entirety and for all purposes.

TECHNOLOGY FIELD

The present application is generally related to liquid-crystal displays (LCDs) and more particularly to manufacturing processes for LCDs.

BACKGROUND

Ultra violet (UV) masks are widely used in LCD manufacturing. During the sealant curing process, a UV mask is often placed in between the LCD cell and the UV light source. The mask covers an active area of the LCD, but leaves the sealant exposed to UV so it can be cured to bond a color filter (CF) glass and thin film transistor (TFT) glass together.

The purpose of the UV mask is to protect organic materials in the active area from being damaged by UV light. For example, liquid crystal can be decomposed by UV and cause bad alignment, image sticking, and other optical artifacts. These defects are commonly referred to as "mura". UV light can also damage organic layers used on TFT and/or CF glass (e.g., negative type of photo-acrylic layer used for passivation) and cause visible artifacts on dark images. UV light may further damage the TFT devices causing artifacts or functional problems of the display.

While the UV light is blocked by the UV mask, it is also reflected by the UV mask. As such, UV light reflected from the LCD on which sealant is being cured may further be reflected by the UV mask and onto UV sensitive portions of the LCD resulting in defects. Conventionally, a thick boarder around the LCD has helped to minimize the effects of the UV reflections and/or to prevent the UV light from reaching the UV sensitive portions of the LCD.

SUMMARY

One embodiment may take the form of a UV mask for use while curing sealant on LCD displays. The UV mask includes a mother glass and a UV mask layer on the mother glass. A UV absorption film is located adjacent the UV mask layer and an anti-reflection (AR) film is located adjacent the UV absorption film.

Another embodiment may take the form of a system having a UV light source configured to direct UV light towards an LCD display assembly to cure sealant material between a TFT glass and a CF glass. The system also includes a UV mask positioned between the UV light source and the LCD display. The UV mask includes a mother glass, a UV mask on the mother glass, and an anti-reflection (AR) film adjacent the UV mask. The AR film includes a plastic substrate adjacent the UV mask and an antireflection coating covering the plastic substrate. The plastic substrate contains UV absorbers.

Yet another embodiment may take the form of a method of blocking UV light during a curing process. The method includes creating a blocking layer on a UV mask mother glass by applying an ink mask to desired regions of the mother glass and creating an anti-reflection layer on the UV mask mother glass covering the blocking layer. Further, the method includes positioning the UV mask mother glass over a display mother glass during a curing process.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments may generally take the form of a UV mask that includes a masking material or coating and an anti-reflection film to help prevent reflections of UV light in the sealant curing process for LCD display manufacture. The AR film may be provided over a UV absorber. Both the AR film and the UV absorber may be located on the same side of the UV mask as the masking material or coating.

The UV mask with the AR film eliminates or significantly reduces multiple reflections of UV light in the curing process. This may help to improve quality and yield of display production as fewer displays will experience the aforementioned defects (e.g., mura) caused by exposure to UV light. Additionally, a greater portion of a mother sheet for LCDs may be utilized as active areas for the LCDs as the UV light will encroach less deeply, and with less intensity, into the active areas during the curing process. Thus, narrow boarder design may be achieved with sealant closer to the active areas.

Figure 1:
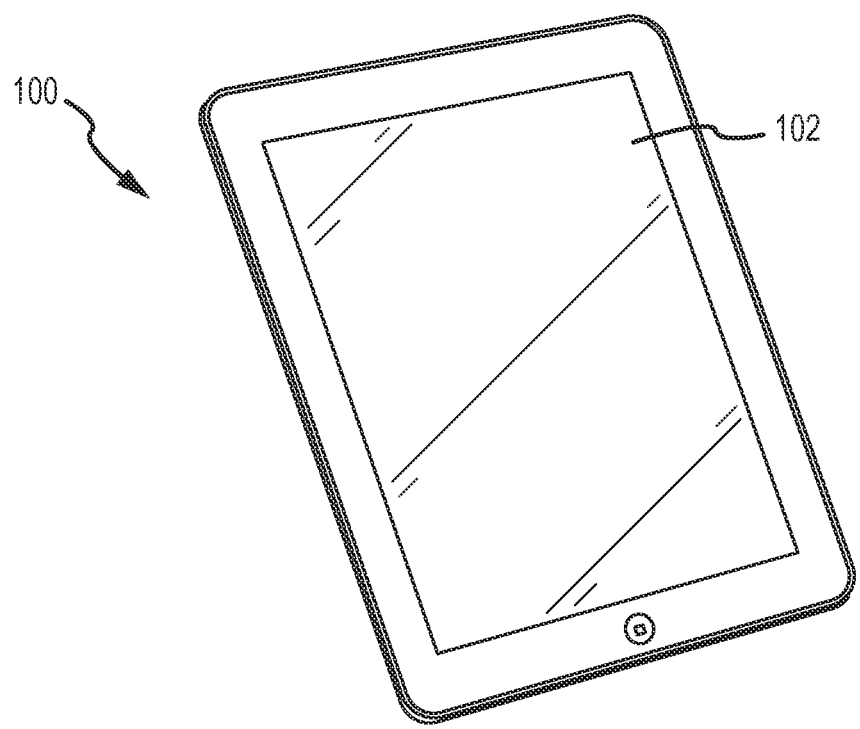
FIG. 1 illustrates an electronic device having an LCD display device.

Turing to the drawings and referring initially to FIG. 1, a computing device 100 including an LCD display device 102 is illustrated. In the shown example, the computing device 100 is a tablet computer. It should be appreciated, however, that present techniques, systems and apparatuses may be utilized to produce LCD displays for all types of electronic devices such as televisions, telephones, smart phones, notebook and desktop computers, and so forth. Thus, the embodiments discussed herein are to be understood merely as examples and not as limiting in scope.

Figure 2A:
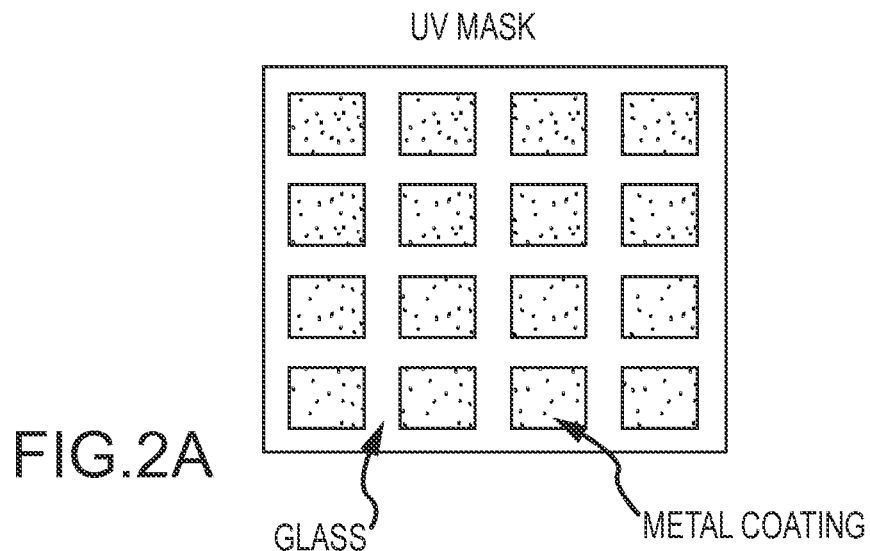
FIG. 2A illustrate a UV mask.

FIG. 2A illustrates an example UV mask. The UV mask has a glass substrate with an array of masking regions. A typical UV mask is a mother glass with patterned non-transmissive metal coatings. That is, in conventional UV masks, the masking regions are formed by a metal coating. In accordance with the techniques disclosed herein, the masking regions may include a black mask (BM) and antireflection film and UV absorbing film, as discussed in greater detail below.

Figure 2B:
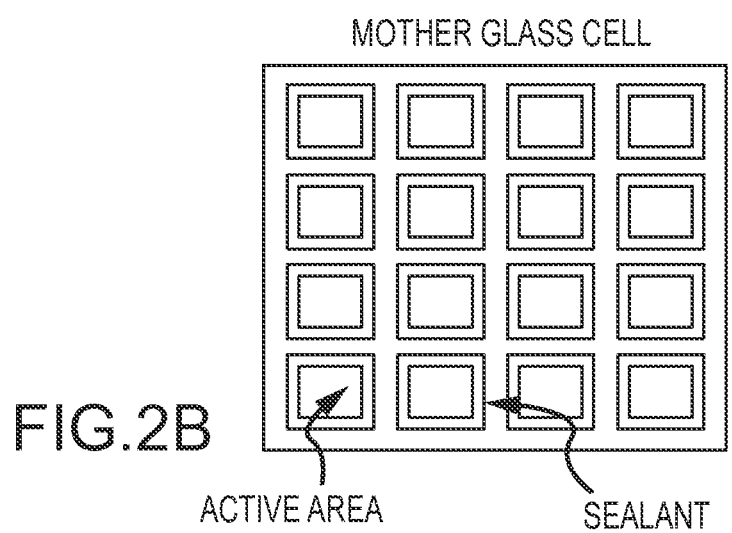
FIG. 2B illustrates a mother glass cells for LCD displays.

FIG. 2B illustrates a mother glass of LCD displays. Generally, the mother glass may include active areas and non-active regions. The active areas may generally be defined as regions that are utilized by an LCD display to display images and which include liquid crystal. Non-active regions may generally be defined as all other regions of the mother glass. As shown in FIG. 2B, active areas may be arranged in an array pattern in the mother glass.

Generally, the mother glass may include multiple layers. In particular, the mother glass may include a thin-film transistor (TFT) glass and a color filter (CF) glass. The TFT glass serves as a substrate for TFTs of an LCD display. The CF glass may serve as a substrate for color filters through which light passes to generate the color of the display. Liquid crystal may be located between the TFT glass and the CF glass in an assembled LCD display.

As shown in FIG. 2B a sealant is provided around the active areas of the mother glass. In particular, sealant is located between the TFT glass and the CF glass to seal the liquid crystal. The sealant is cured through exposure to UV light.

Figure 2C:
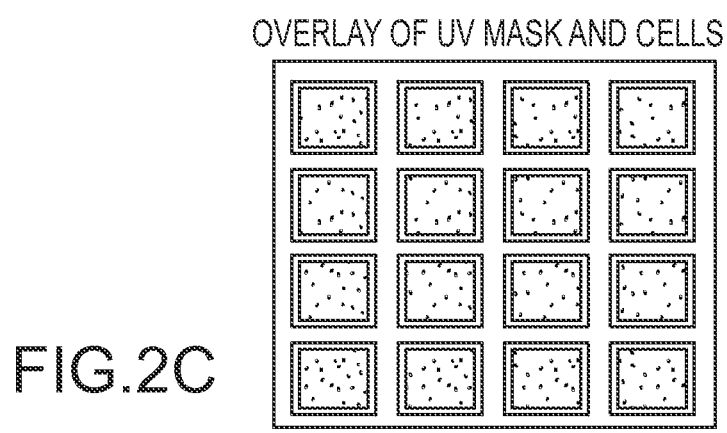
FIG. 2C illustrates the UV mask of FIG. 2A overlaid on the mother glass cells of FIG. 2B.

FIG. 2C illustrates the overlay of the UV mask of FIG. 2A on the mother glass cells of FIG. 2B. The mask regions of the UV mask cover the active areas of the mother glass to prevent direct exposure of the active areas to the UV light.

Figure 3:
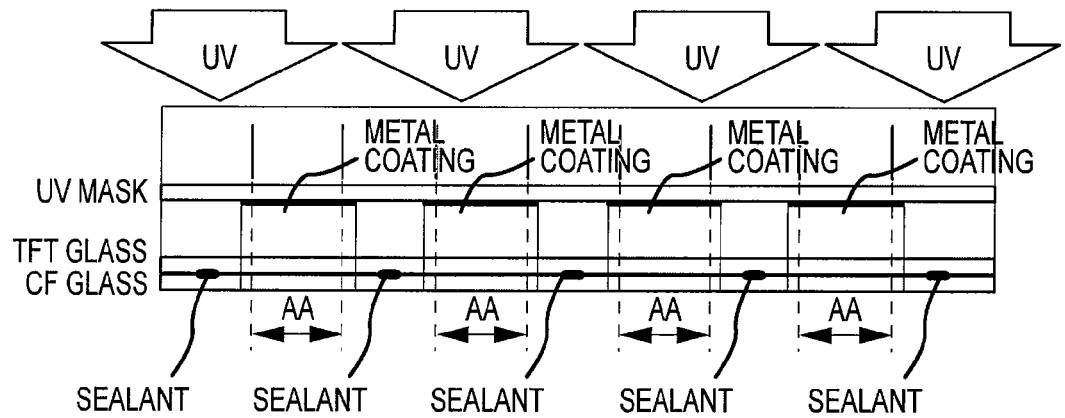
FIG. 3 illustrates UV light curing sealant on LCD assemblies.
Figure 4A:
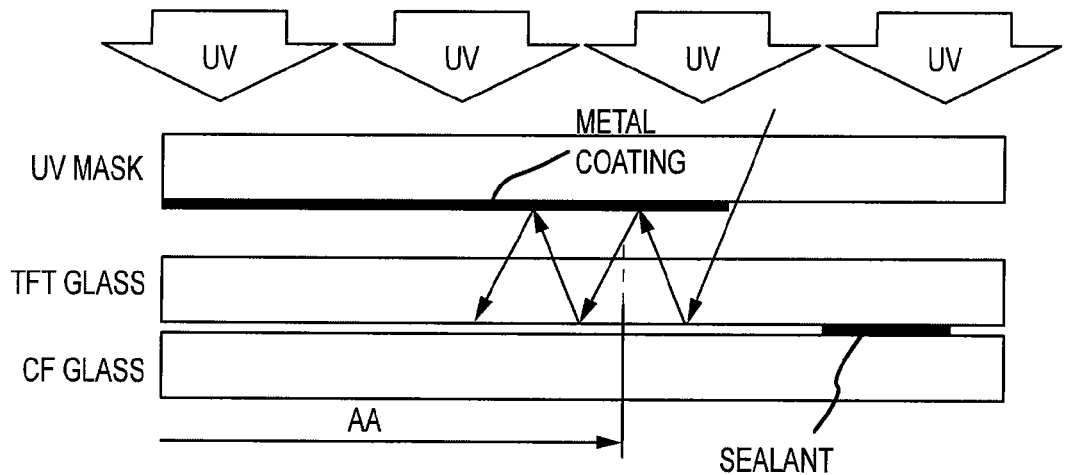
FIG. 4A is a zoomed in view of a portion of FIG. 3 showing the reflections of the UV light reaching an active area of an LCD.

FIG. 3 illustrates UV light curing sealant on LCD assemblies with a metal coating mask protecting active areas (AA) of the mother glass from direct exposure of UV light. FIG. 4A is a zoomed view of a portion of FIG. 3 showing the reflections of the UV light reaching an active area of an LCD. In particular, the UV light is shown as reflecting back from the mother glass to an underside of the metal coating and then back to the mother glass an into an active area of the mother glass.

Figure 5:
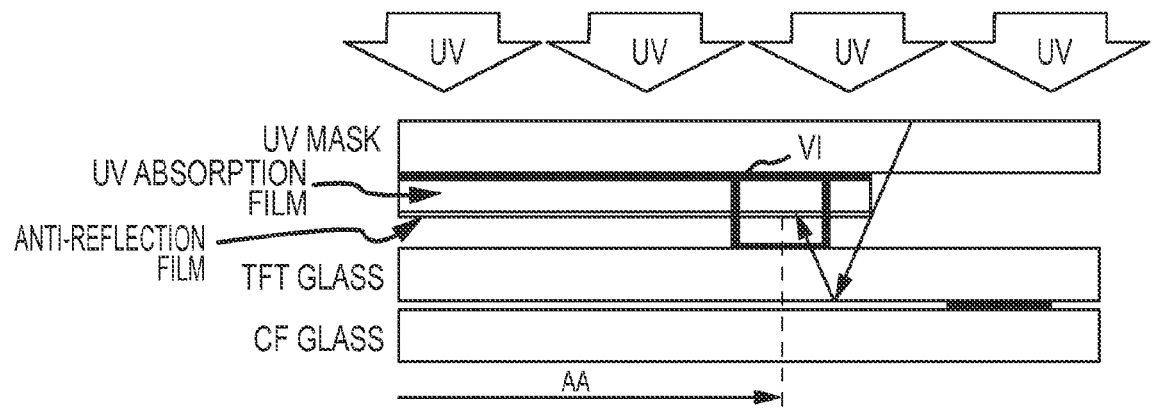
FIG. 5 illustrates UV light reflected from the LCD assembly to a UV mask that includes an anti-reflection film and a UV absorption film.

FIG. 5 illustrates a UV mask that includes an anti-reflection film and a UV absorption film to prevent reflections from the mask to the mother glass. In this embodiment, the UV mask may include a metal coating or a black mask (BM). As shown, the UV absorption film is adjacent to and covers the UV mask.

The anti-reflection film or coating is provided over the UV absorbing film. An adhesive may be used to adhere the UV absorber to the mask. As such, the antireflection film is placed on top of the UV mask, with the anti-reflection layer facing towards the LCD assembly. In one embodiment, the UV blocking layer on the mask (e.g., metal and/or BM) are on the same side of the glass as the anti-reflection film. The antireflection film may generally include a plastic substrate that contains UV absorbers and an anti-reflection coating that is effective in the UV range of the spectrum.

Figure 6:
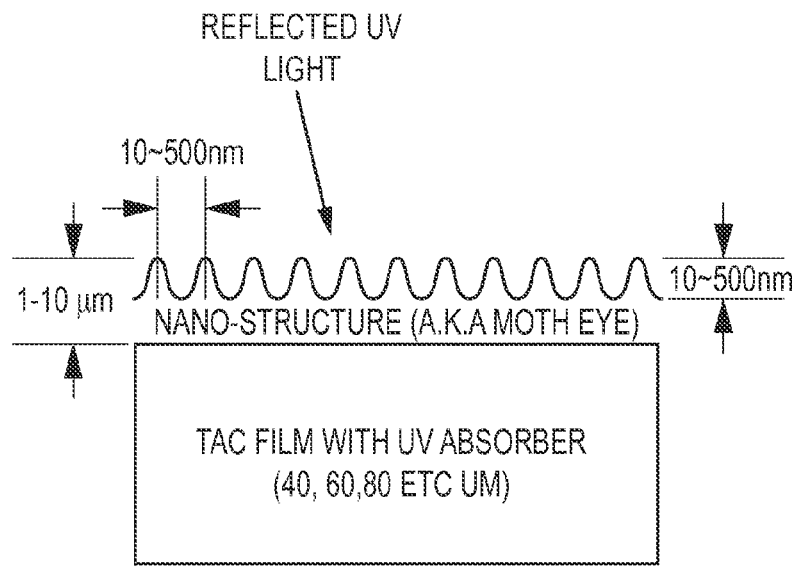
FIG. 6 is a zoomed in view of the anti-reflection film, the UV absorption film and an adhesive.

FIG. 6 is a zoomed in view of the anti-reflection film, the UV absorption film and the adhesive, in accordance with one example embodiment. The adhesive may take any suitable form and may be between approximately 10 and 500 micrometers thick. The UV absorption film may take any suitable form and in one embodiment may take the form of a triacetyl cellulose (TAC) with UV absorber. The UV absorption film may be approximately 20, 60, 80, or 100 micrometers thick or more or less. The antireflection film may take any suitable form and in one embodiment may take the form of a nano-structure, such as moth eye, as shown. The nano-structure may be between 1 and 10 micrometers thick and may include structures between approximately 10 and 500 nanometers tall with a period of approximately 10-500 nanometers (e.g., the peaks of the structures are separated by approximately 10-500 nanometers). In other embodiments, the anti-reflection coating may take the form of a multi-layer thin film coating.

When UV light hits the TFT glass and is reflected back toward the mask, the light may pass through the anti-reflection layer to be absorbed by the UV absorber and the UV mask (e.g., blocking layer). Very little light is reflected again towards the TFT glass. As a result the amplitude of reflected light damps very quickly before reaching an active area. With proper selection of anti-reflection material the UV light reflected may be reduced to a negligible level in the active area (e.g., a level that does not cause defects or mura).

Figure 7:
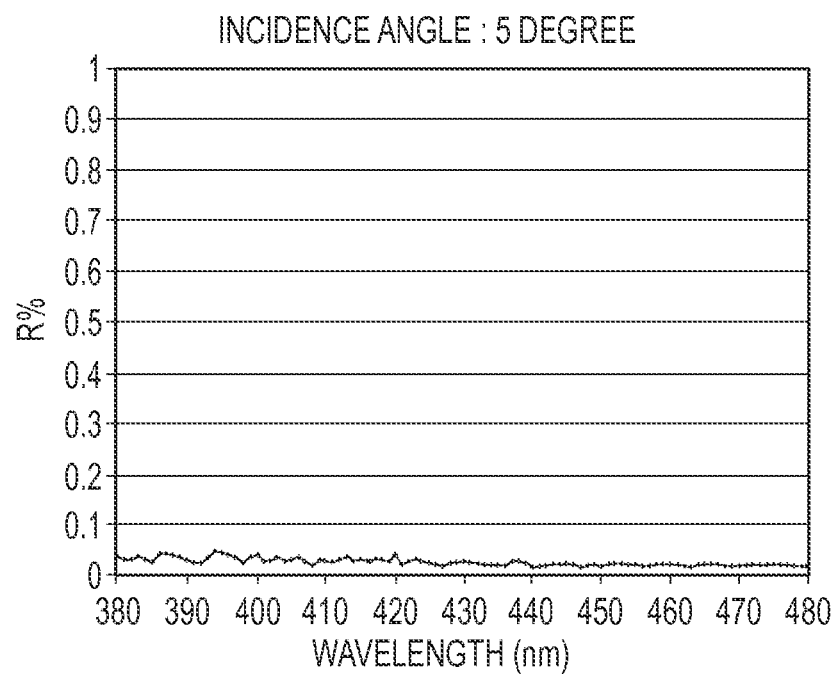
FIG. 7 is a plot illustrating the percentage of reflectance of UV light from the anti-reflection film.

FIG. 7 is a plot illustrating the percentage of reflectance of UV light from the anti-reflection film. The vertical axis represents percentage of reflectance and the horizontal axis represents the wavelength of light in nanometers (nm). As may be seen, there is approximately less than 0.05% reflection of light in wavelengths between 380-480 nm. Accordingly, there is very little reflectance from the anti-reflectance film.

Figure 8:
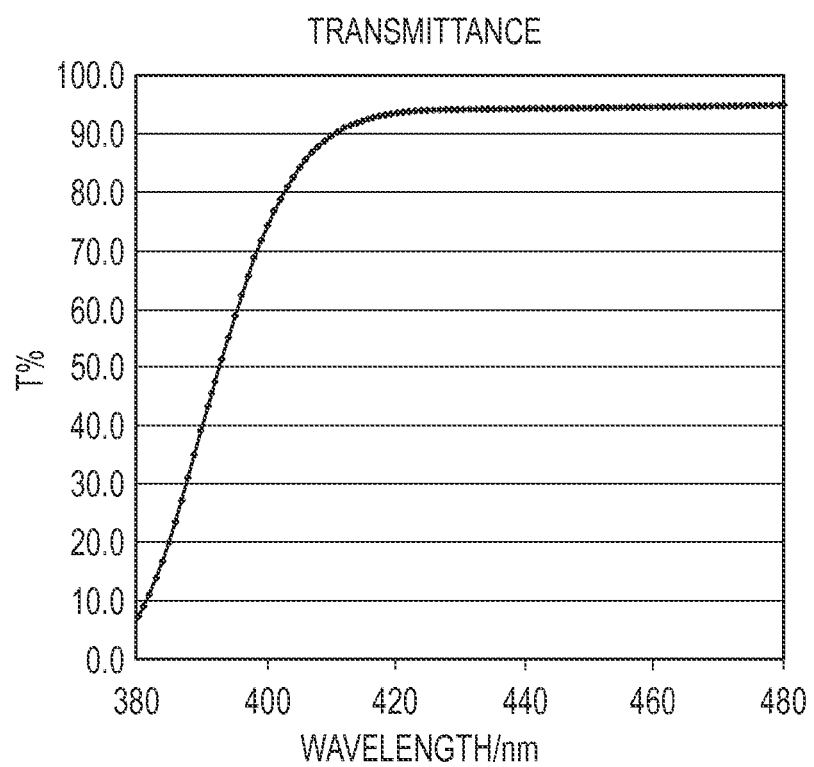
FIG. 8 is a plot illustrating the percentage of transmittance of UV light through the anti-reflection film.

FIG. 8 is a plot illustrating the percentage of transmittance of UV light through the anti-reflection film. the vertical axis represents percentage of transmittance and the horizontal axis represents the wavelength of light in nanometers (nm). Note that UV light transmitted through the film increases from less than 10 percent at 380 nm. As such, there is UV light transmitted through the film, particularly in the near-UV region of the spectrum. The transmitted light may be absorbed by the UV absorber layer and the UV mask (blocking layer). Also, the UV transmittance of the anti-reflection film can further be reduced by increasing film thickness or the UV absorber concentration.

Figure 4B:
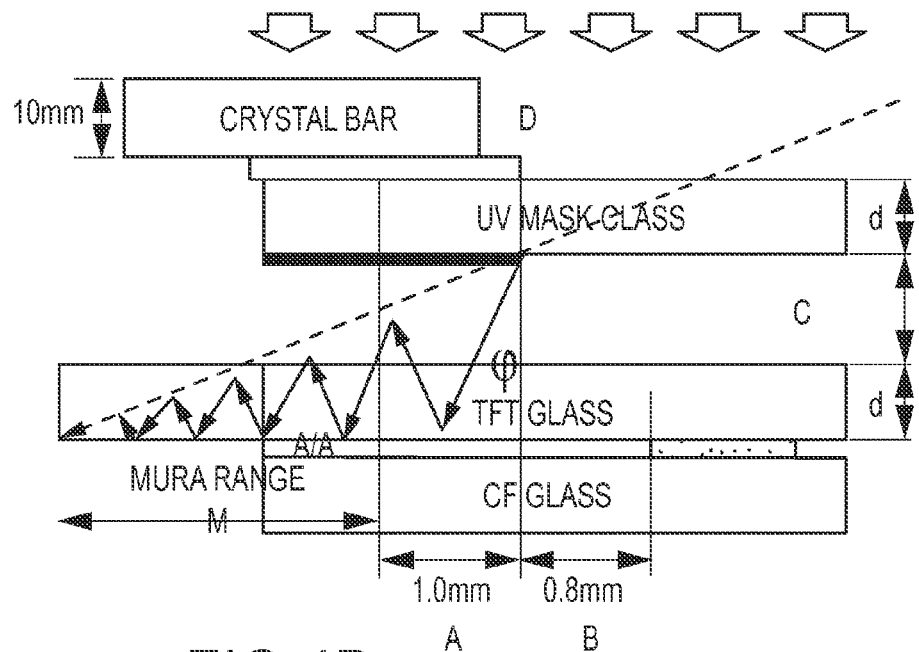
FIG. 4B illustrates in more detail the reflections of the UV light.

Light intensity attenuation was simulated at the edge of the UV mask boarder to determine its propagation into the active area. FIG. 4B generally illustrates the model used for the simulation and is generally similar to FIG. 4A. In FIG. 4B, the distance A from the edge of the UV mask to the active area may be between 0.8 and 1.0 mm. The distance B from the sealant to the edge of the mask may similarly be between 0.8 and 1.0 mm. The TFT glass and the UV mask glass may each be a thickness d of approximately 0.7 mm and the distance C separating the UV mask glass and the TFT may be approximately 1.5 mm. A crystal bar supporting the UV mask glass may be approximately 10 mm thick and adhesive may hold the crystal bar and the UV mask glass together.

In the simulation, different incident angles of UV light were presumed and a half-angle φ is a half angle of the light path cone. That is φ may be defined as the angle of reflectance relative to a plane normal to the reflecting surface, as shown in FIG. 4B. Further, the simulation estimated reflectance of metal as 45%, BM as 12% and AR film as less than 1%. FIGS. 9-13 illustrate plots resulting from the simulation.

Figure 9:
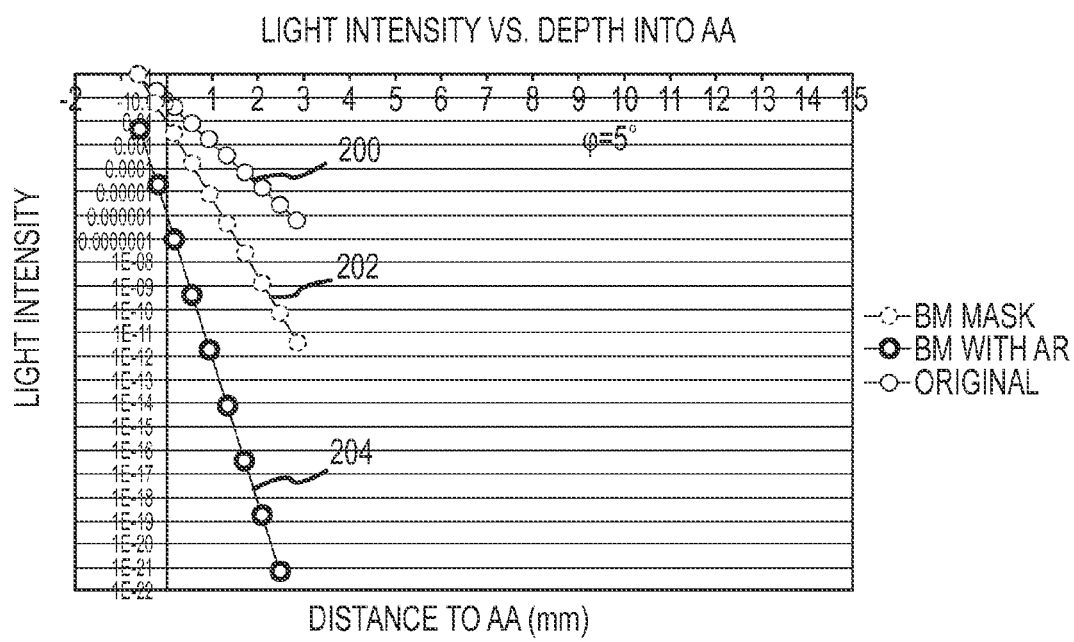
FIG. 9 is a plot illustrating the UV light intensity versus depth into active areas for an original mask, a BM mask and a BM mask with anti-reflection coating for reflected light having a half-angle of 5 degrees.

FIG. 9 is a plot illustrating the UV light intensity versus depth into active areas for an original mask, a BM mask and a BM mask with anti-reflection coating for reflected light having a half-angle of 5 degrees. The vertical axis is the light intensity scaled so that a value of 1 is the highest intensity of light reflected for the simulated masks. The horizontal axis represents the distance in millimeters (mm) into an active area the light is reflected. Plot line 200 represents the conventional metal coating mask, plot line 202 represents the BM mask, and plot 204 represents the BM mask with anti-reflection film and UV absorber.

As shown, the BM mask with the anti-reflection film and UV absorber results in shallower reflection depths into active areas with high attenuation of the light. For example, the last point in plot line 204 is approximately 2 mm deep with the light intensity being less than $1e^{-21}$. To compare, both the BM mask and the metal coating mask penetrate to approximately 3 mm with a final light intensity of more than $1e^{-12}$ and $1e^{-7}$. Perhaps more importantly, at the threshold into the active area (e.g., distance 0) the light reflected from the BM mask with anti-reflection and UV absorber has an intensity of approximately 0.000001, whereas the BM mask has an intensity of 0.01 and the metal coating mask has an intensity of approximately 0.1. As such, the BM mask with anti-reflection and UV absorber prevents the light from reflecting as far towards the active area and, furthermore, reduces the light intensity far beyond that of the other masks so that it is negligible (e.g., does not result in mura) in the active area.

Figure 10:
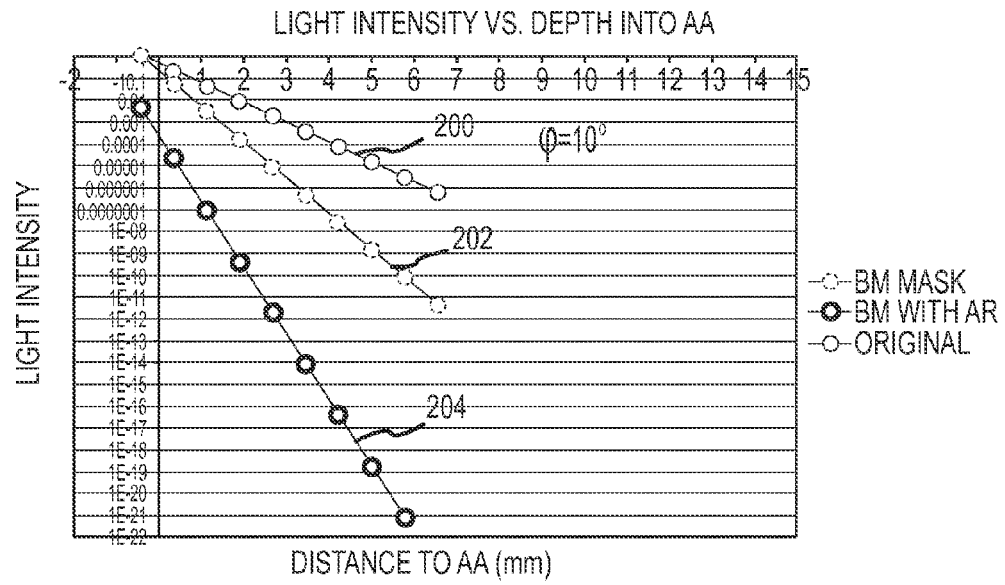
FIG. 10 is a plot illustrating the UV light intensity versus depth into active areas for an original mask, a BM mask and a BM mask with anti-reflection coating for reflected light having a half-angle of 10 degrees.
Figure 11:
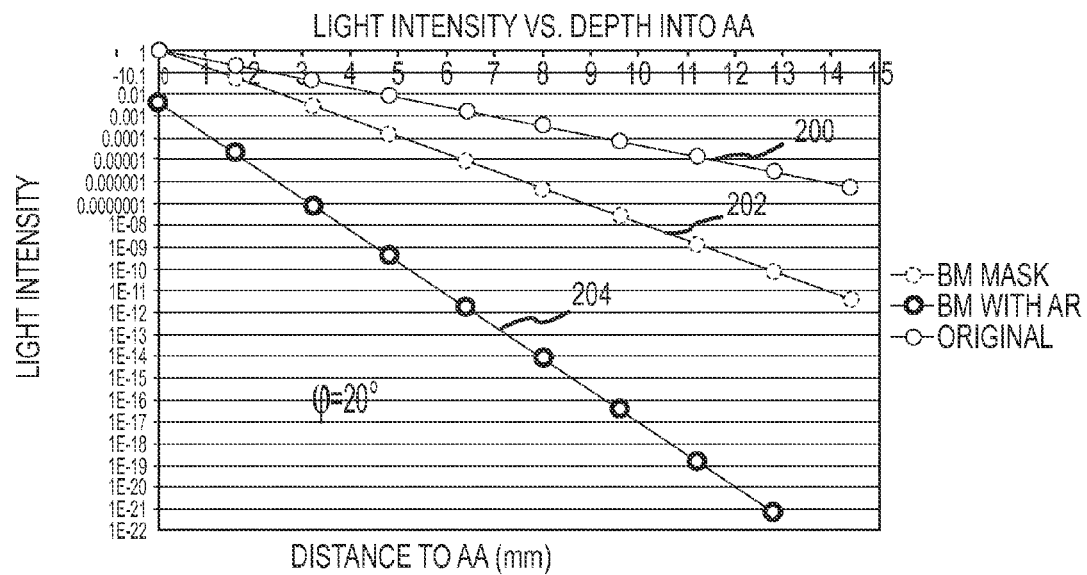
FIG. 11 is a plot illustrating the UV light intensity versus depth into active areas for an original mask, a BM mask and a BM mask with anti-reflection coating for reflected light having a half-angle of 20 degrees.
Figure 12:
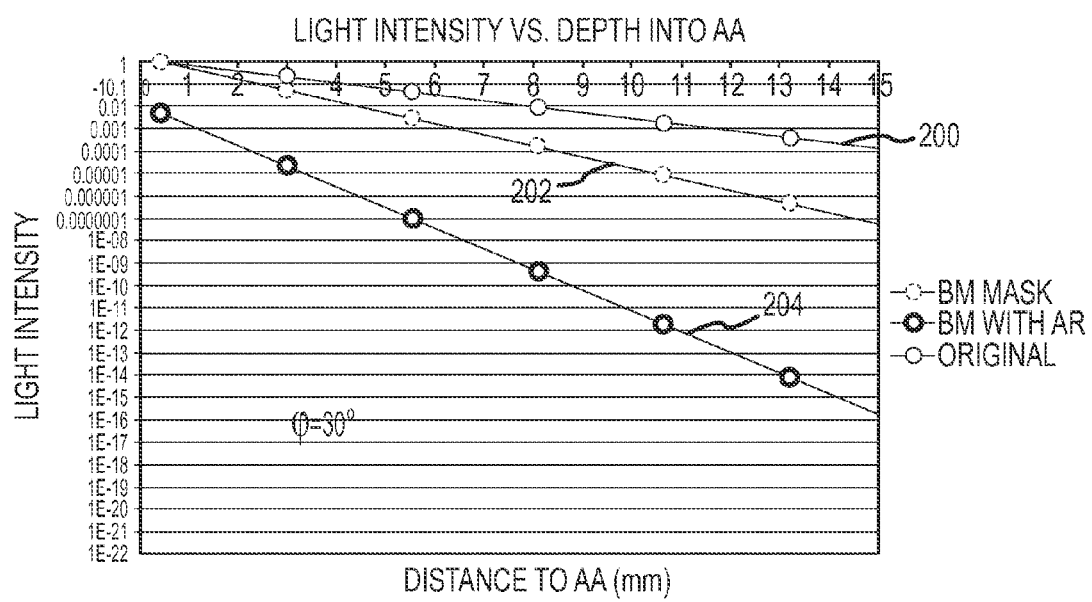
FIG. 12 is a plot illustrating the UV light intensity versus depth into active areas for an original mask, a BM mask and a BM mask with anti-reflection coating for reflected light having a half-angle of 30 degrees.

Each of FIGS. 10-12 illustrates the same trend as shown in FIG. 9. The same numbering is used in FIGS. 10-12 for the metal coating mask 200, BM mask 202, and BM mask with anti-reflection and UV absorber 204. Additionally, the same units and scale are used in FIGS. 10-12 as were used in FIG. 9.

FIG. 10 is a plot illustrating the UV light intensity versus depth into active areas for an original mask, a BM mask and a BM mask with anti-reflection coating for reflected light having a half-angle of 10 degrees. FIG. 11 is a plot illustrating the UV light intensity versus depth into active areas for an original mask, a BM mask and a BM mask with anti-reflection coating for reflected light having a half-angle of 20 degrees. FIG. 12 is a plot illustrating the UV light intensity versus depth into active areas for an original mask, a BM mask and a BM mask with anti-reflection coating for reflected light having a half-angle of 30 degrees.

Figure 13:
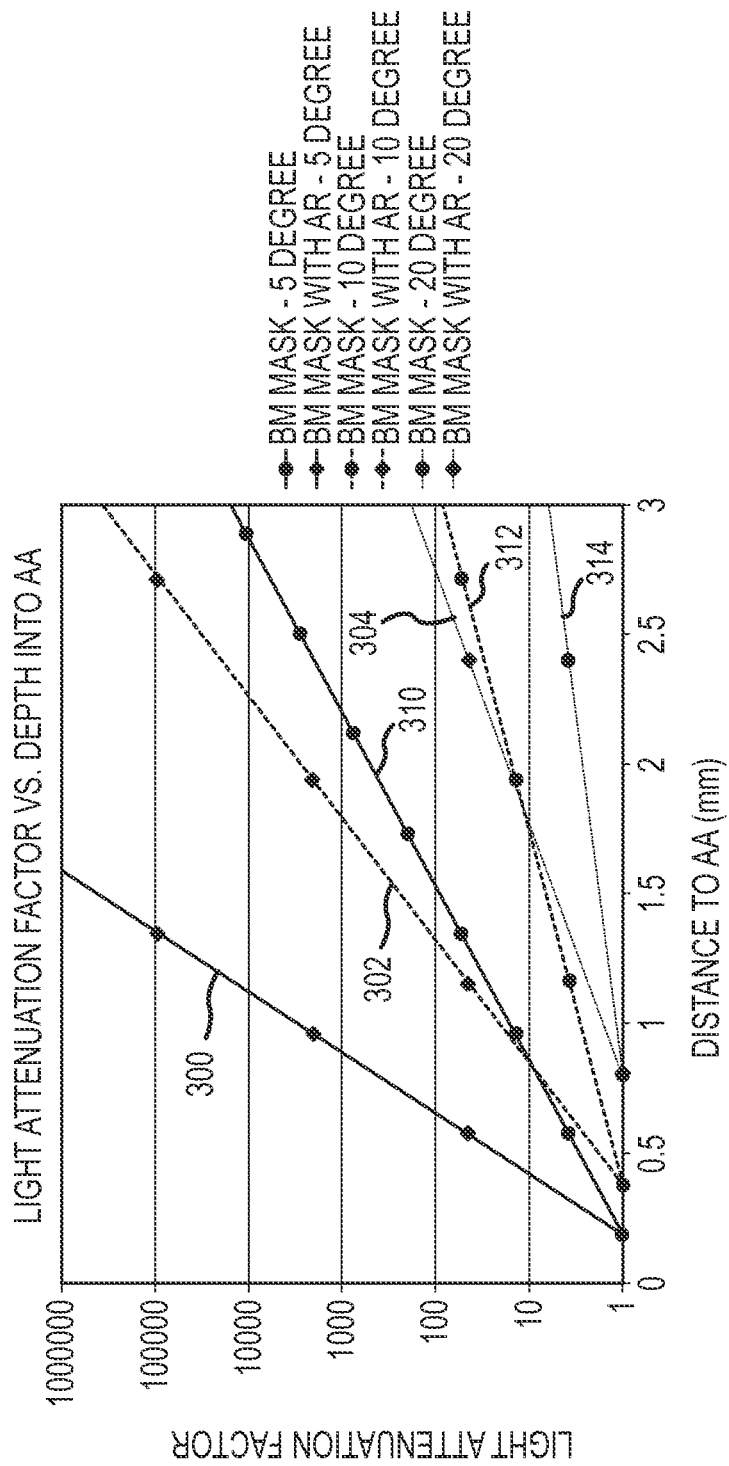
FIG. 13 is a plot illustrating the UV light attenuation factor versus depth into active areas for an a BM mask and a BM mask with anti-reflection coating for reflected light having half-angles of 5, 10 and 20 degrees.

FIG. 13 is a plot illustrating the UV light attenuation factor versus depth into active areas for an a BM mask and a BM mask with anti-reflection coating for reflected light having half-angles of 5, 10 and 20 degrees. The vertical axis represents the light attenuation factor while the horizontal axis indicates the distance into the active area in millimeters. Plot lines 300, 302 and 304 illustrate a BM mask with antireflection film and UV absorber with half angles φ of 5, 10 and 20 degrees, respectively. Plot lines 310, 312, and 314 illustrate a BM mask with the same respective half angles φ previously set forth. As may be seen, the light attenuation is much better using the antireflection film and UV absorber and the distance into the active area is reduced.

Table 1 shows results comparing an original mask, a BM mask and a BM mask with anti-reflection film at light reflection half-angles of 5, 10, 20 and 30 degrees. The original mask refers to the metal coating masks conventionally implemented and sets a baseline against which the other masks are compared. The BM mask provides 50 time attenuation, six times attenuation, and double the attenuation of the original mask with half angles φ of 5, 10 and 20 degrees, respectively. The BM mask with anti-reflection film achieved 90,000 times attenuation, 500 time attenuation, and five times attenuation, respectively, with the same half angles φ. As can be appreciated, the BM mask with anti-reflection film provides a much high level of attenuation than the others.

TABLE 1

| φ | Original Mask | BM Mask | BM + AR Film |
|---|---|---|---|
| 5° | Baseline | 50× attenuation | 90000× attenuation |
| 10° | Baseline | 6× attenuation | 500× attenuation |
| 20° | Baseline | 2× attenuation | 5× attenuation |
| 30° | Baseline | | |

The foregoing describes some example embodiments of a UV mask that includes anti-reflection film and UV absorber. Although the foregoing discussion has presented specific embodiments, persons skilled in the art will recognize that changes may be made in form and detail without departing from the spirit and scope of the embodiments. For example, the order and arrangement of layers in the mask may vary and/or one or more layer may be omitted and/or replaced with different layer. Accordingly, the specific embodiments described herein should be understood as examples and not limiting the scope thereof.

We claim:

1. A UV mask comprising:
a mother glass;
a UV mask layer on the mother glass;
a UV absorption film adjacent the UV mask layer;
an adhesive layer between the UV absorption film and the UV mask layer; and
an anti-reflection film adjacent the UV absorption film.

2. The UV mask of claim 1, wherein the anti-reflection film comprises a nano-structure.

3. The UV mask of claim 2, wherein the nano-structure comprises a moth-eye structure.

4. The UV mask of claim 2, wherein the nano-structure is approximately 1 to 10 micrometer thick and has structures of approximately 10-500 nanometer tall, the structures having a period of approximately 10-500 nanometers.

5. The UV mask of claim 1, wherein the UV mask comprises a black mask.

6. The UV mask of claim 1, wherein the adhesive layer is approximately 10-500 micrometers thick.

7. A UV mask comprising:
a mother glass;
a UV mask layer on the mother glass;
a UV absorption film adjacent the UV mask layer; and
an anti-reflection film adjacent the UV absorption film;
wherein the UV absorption film comprises a triacetyl cellulose (TAC) film with UV absorber.

8. The UV mask of claim 1, wherein the anti-reflection coating comprises a multi-layer thin film coating.

9. A UV mask comprising:
a mother glass;
a UV mask layer on the mother glass;
a UV absorption film adjacent the UV mask layer; and
an anti-reflection film adjacent the UV absorption film;

wherein the TAC film is approximately equal to or less than approximately 40, 60, 80, or 100 micrometers thick.

10. A system comprising:
a UV light source configured to direct UV light towards an LCD display assembly to cure sealant material between a TFT glass and a CF glass; and
a UV mask positioned between the UV light source and the LCD display comprising:
    a mother glass;
    a UV mask on the mother glass; and
    an anti-reflection film adjacent the UV mask, wherein the anti-reflection film comprises:
        a plastic substrate adjacent the UV mask, the plastic substrate containing UV absorbers; and
        an antireflection coating covering the plastic substrate.

11. The system of claim 10, wherein the UV mask further comprises a crystal bar supporting the mother glass.

12. The system of claim 10, wherein anti-reflection coating comprises a multi-layer thin film coating.

13. The system of claim 10, wherein the anti-reflection coating comprises a broadband antireflection nano-structure.

14. The system of claim 13, wherein the nano-structure comprises a moth-eye structure.

15. The system of claim 13, wherein the nano-structure is approximately 1 to 10 micrometer thick and has structures of approximately 10-500 nanometer tall, the structures having a period of approximately 10-500 nanometers.

16. A method of blocking UV light during a curing process, the method comprising:
    creating a blocking layer on a UV mask mother glass by applying an ink mask to desired regions of the mother glass;
    creating an anti-reflection layer covering the blocking layer on the UV mask mother glass; and
    positioning the UV mask mother glass over a display mother glass during a curing process.

17. The method of claim 16, wherein creating an absorbing layer comprises:
    applying a plastic substrate adjacent the blocking layer, the plastic substrate containing UV absorbers; and
    applying an anti-reflection coating over the plastic substrate.

18. The method of claim 17, wherein the anti-reflection coating comprises a broadband antireflection nano-structure.

19. The method of claim 16, wherein the curing process comprises a sealant curing process of LCD displays.

* * * * *

UNITED STATES PATENT AND TRADEMARK OFFICE
CERTIFICATE OF CORRECTION

PATENT NO. : 8,703,365 B2
APPLICATION NO. : 13/633812
DATED : April 22, 2014
INVENTOR(S) : Cheng Chen, Kyung Wook Kim and John Zhong It is certified that error appears in the above-identified patent and that said Letters Patent is hereby corrected as shown below:

In the Claims:

In column 6, lines 63-67 thru column 7, lines 1 thru 2, (Claim 9) is corrected to read as follows by changing "adiacent" to read --adjacent-- in column 6, lines 66 and 67.

--9. A UV mask Comprising: a mother glass; a UV mask layer on the mother glass; a UV absorption film --adjacent-- "adiacent" the UV mask layer; and an anti-reflection film --adjacent-- "adiacent" the UV absorption film; wherein the TAC film is approximately equal to or less than approximately 40, 60, 80, or 100 micrometers thick.--.

Signed and Sealed this
Twenty-sixth Day of August, 2014

Michelle K. Lee
*Deputy Director of the United States Patent and Trademark Office*